(12) United States Patent
Robert

(10) Patent No.: US 8,509,522 B2
(45) Date of Patent: Aug. 13, 2013

(54) CAMERA TRANSLATION USING ROTATION FROM DEVICE

(75) Inventor: Luc Franck Robert, Valbonne (FR)

(73) Assignee: Autodesk, Inc., San Rafael, CA (US)

( * ) Notice: Subject to any disclaimer, the term of this patent is extended or adjusted under 35 U.S.C. 154(b) by 483 days.

(21) Appl. No.: 12/905,861

(22) Filed: Oct. 15, 2010

(65) Prior Publication Data

US 2012/0093393 A1  Apr. 19, 2012

(51) Int. Cl.
*G06K 9/00* (2006.01)
*G06K 9/36* (2006.01)

(52) U.S. Cl.
USPC .......................... 382/154; 382/285; 345/419

(58) Field of Classification Search
USPC ................. 382/154, 285; 345/419
See application file for complete search history.

(56) References Cited

U.S. PATENT DOCUMENTS

| | | | | |
|---|---|---|---|---|
| 6,246,412 B1* | 6/2001 | Shum et al. | .................... | 345/419 |
| 6,271,855 B1* | 8/2001 | Shum et al. | .................... | 345/427 |
| 6,668,082 B1* | 12/2003 | Davison et al. | .............. | 382/190 |
| 6,785,427 B1* | 8/2004 | Zhou | ............................. | 382/294 |
| 7,184,036 B2* | 2/2007 | Dimsdale et al. | ............. | 345/419 |
| 7,308,115 B2* | 12/2007 | Zhang et al. | .................. | 382/107 |
| 8,363,928 B1* | 1/2013 | Sharp | ............................. | 382/154 |
| 2003/0044048 A1* | 3/2003 | Zhang et al. | .................. | 382/107 |
| 2008/0031514 A1* | 2/2008 | Kakinami | ..................... | 382/154 |
| 2010/0316281 A1* | 12/2010 | Lefevre | ........................ | 382/154 |

OTHER PUBLICATIONS

Martinec, D. et al., "Robust rotation and translation estimation in multiview reconstruction," In Proceedings of the Computer Vision and Pattern Recognition conference 2007, IEEE, Minneapolis, MN, USA, Jun. 2007, pp. 1-8.

* cited by examiner

*Primary Examiner* — John Strege

(74) *Attorney, Agent, or Firm* — Gates & Cooper LLP

(57) ABSTRACT

A method, apparatus, system, article of manufacture, and computer readable storage medium provides the ability to determine two or more camera viewpoint optical centers. A first image and a second image captured by camera devices (and the rotations for the camera devices) are obtained. For each pair of matched points between the first image and the second image, a linear equation is defined that utilizes the rotations, pixel coordinates of the matched points and optical centers. A matrix $A^TA$ is computed where each row of A corresponds to a pair of matched points and the number of columns is 3N (N representing the number of camera devices). The matrix is solved resulting in an eigenvector that holds the optical centers that are used to output image information.

21 Claims, 5 Drawing Sheets

CAMERA TRANSLATION USING ROTATION FROM DEVICE

BACKGROUND OF THE INVENTION

1. Field of the Invention

The present invention relates generally to a method, apparatus, and article of manufacture for locating one or several cameras in three-dimensional (3D) space based on two-dimensional (2D) pictures from the camera. Embodiments of the invention may also apply to the field of augmented reality.

2. Description of the Related Art

In 3D computer applications, it is desirable to simulate a real world location/object/image in 3D space. To create a 3D computer representation, 2D data is received/input and used to reconstruct the 3D representation. For example, 2D photographs and videos may be used as a foundation to create a 3D representation of the image depicted. To create the 3D representation, a requisite basic computation is that of determining the location/viewpoint of the camera in 3D space. Once the location of the viewpoints are determined, the different viewpoints can be combined to reconstruct the 3D representation. Prior art methodologies are computation intensive and fail to provide an efficient and easy mechanism for computing a viewpoint and creating a 3D representation. Such problems may be better understood with a more detailed explanation of 3D applications, representations, and prior art systems for constructing 3D representations based on 2D data.

2D images from photographs and videos can be used for a wide range of 3D applications. In augmented reality, a user may simulate a 3D environment over 2D data (e.g., for an architectural project, one may desire to create a virtual building with video footage). In photogrammetry/3D image-based modeling, a user may desire to recreate something that exists in the real world. Based on multiple images (e.g., of a single location from different viewpoints), a user may also desire to automatically produce a 3D scene (e.g., automatic multi-view 3D reconstruction) (e.g., combine separate images of a left view, right view, top view, etc. of an object to recreate a single 3D view of the object). Alternatively, in an organized picture collection (such as Photosynth™ available from Microsoft™) various 2D pictures may be organized in 3D space to recreate a 3D scene that a user can view and move around in (the application performs a global computation of a location of all of the pictures such that pictures in the collection can be rotated in a 3D oriented manner). In another example, in movie special effects, the motion of the real camera may be needed so that when a virtual object (e.g., a virtual dinosaur) is rendered, the virtual object is synchronized with the camera footage.

The basic computation used in all of the above identified applications is that of identifying the location/viewpoint of the camera in 3D space. Once the location/viewpoints are identified, a virtual 3D world can be created (and synchronized with any video footage if desired). Prior art methods use images and attempt to match up 2D points across the images in order to estimate camera placement. As part of this process, there are several different parameters that need to be estimated so that the images are properly localized in space. Prior art methods for determining such parameters and camera placement are time and computationally expensive.

In addition to actual commercial products, algorithms used in the research community to determine the location/viewpoint of the camera are also computation intensive. Such algorithms rely on estimating location when the only information available is that of the image itself (e.g., no additional parameters are known such as camera location, orientation, angle, etc.). In this regard, points of interest in the images are tracked and used to establish a correspondence across the images (between the points). For example, a point that represents a window in a corner of a screen may be matched/mapped with a pixel in the image on the screen. Signal processing then provides a number of point correspondences across images. With the points, various equations are then solved to determine where the images in 2D space correspond with a 3D environment (e.g., point X in the image in the corner of the screen corresponds to point Y in 3D space).

Alternatively, various parameters of the camera may be known (e.g., location of camera, orientation, focal length, distortion of lens, etc.). Using all known parameters, prior art computations of the location/viewpoint is processor intensive and relies on optimization. For example, with one hundred (100) cameras and one hundred (100) points, with each camera there are three (3) rotations and three (3) translations (six [6] parameters per camera) plus three (3) (x,y,z) coordinates per point. Accordingly, one hundred (100) cameras results in six hundred (600) parameters plus three hundred (300) points to provide nine hundred (900) parameters for a simple problem. Accordingly, using all parameters is processor intensive and not feasible for high resolution data or for any type of data where real-time processing is desirable.

In view of the above limitations, attempts have been made to expedite the location determination process. One such prior art technique by Daniel Martinec introduces a global process of "structure of motion" by computing camera 3D positions and orientations from 2D point matches in images. Martinec's technique is performed in two stages by first estimating all rotations, followed by estimating all translations (see Daniel Martinec and Tomas Pajdla, "Robust Rotation and Translation Estimation in Multiview Reconstruction", In *Proceedings of the Computer Vision and Pattern Recognition conference* 2007, IEEE, Minneapolis, Minn., USA, June 2007 which is incorporated by reference herein). However, Martinec's translation estimation involves a heavy non-linear optimization process that is computation intensive and not possible for real-time performance.

Accordingly, what is needed is the capability to solve for the location of cameras in a computationally and time efficient manner.

SUMMARY OF THE INVENTION

One or more embodiments of the invention provide the ability to compute a final 3D image based on multiple 2D images in an efficient manner. To provide such computations, various parameters already known/available to an application are utilized. For example, many parameters may be available through hardware devices currently being used (e.g., cellular phones, other devices with GPS [global positioning system], accelerometers, etc.). Knowledge of such parameters and associating the parameters with an image reduces the time taken to render a final image.

A basic mechanism is a closed-form solution for the estimation of the positions of cameras when their rotation and internal parameters are known. The solution expresses the problem using a system of linear equations that can be solved through standard least squares solving. Accordingly, solving for N cameras reduces the computation to eigenvectors/SVD (singular value decomposition) for a 3N×3N matrix. Embodiments of the invention assume that one or several cameras are equipped with hardware sensors that provide rotation angles of the camera (e.g., on a cellular phone, a roll/tilt parameter may be determined based on accelerometers and panning may be provided using a compass). Based on such known parameters, camera positions can be quickly and efficiently estimated based on very few point correspondences.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

One or more embodiments of the invention utilize known parameters from a device that has generated a source image in order to calculate camera position of the device. Depending on the acquisition conditions, rotation parameters (some or all) can also be estimated from the images using directions of perspective/vanishing points.

Hardware Environment

Figure 1:
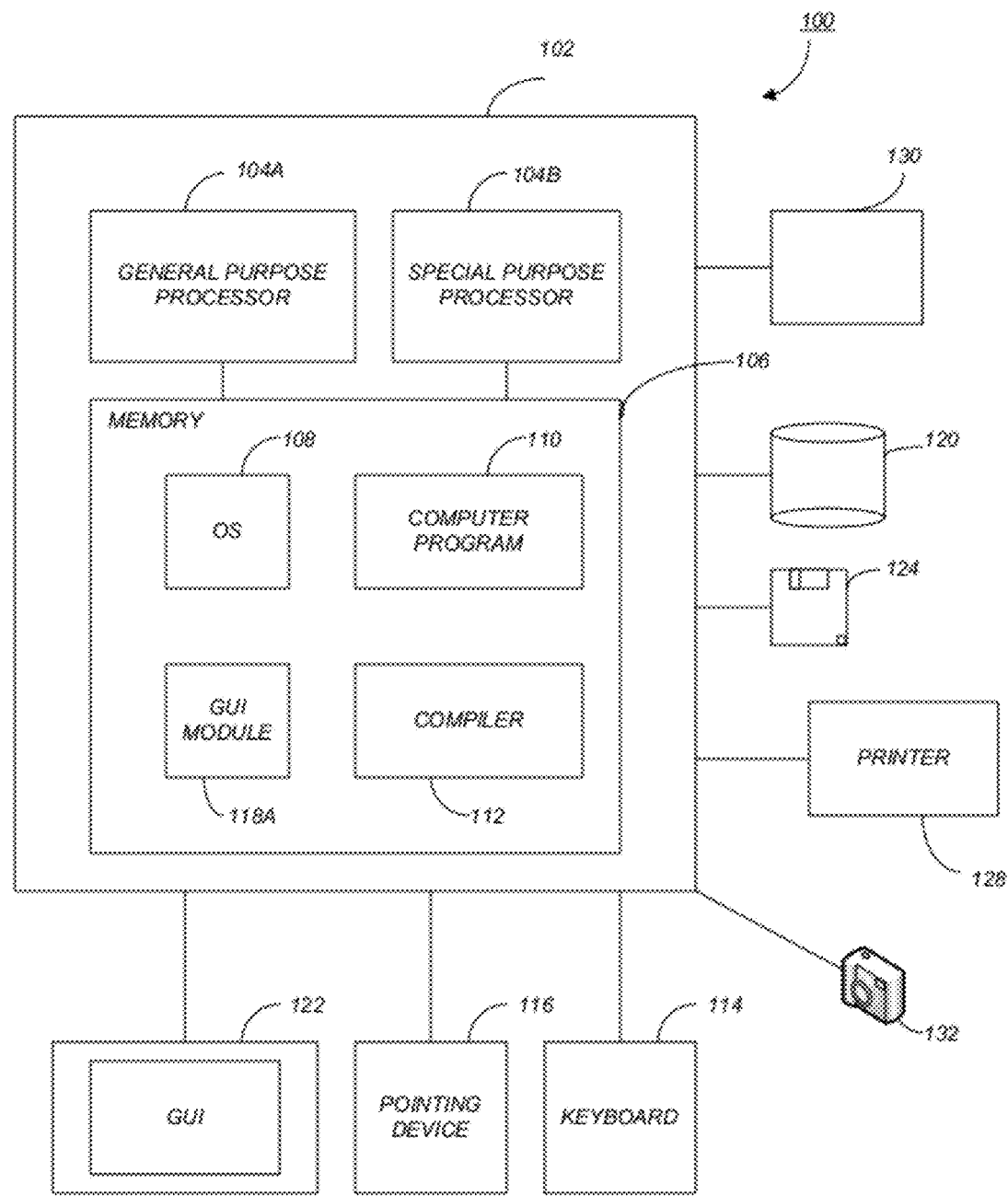
FIG. 1 is an exemplary hardware and software environment 100 used to implement one or more embodiments of the invention.

FIG. 1 is an exemplary hardware and software environment 100 used to implement one or more embodiments of the invention. The hardware and software environment includes a computer 102 and may include peripherals. Computer 102 may be a user/client computer, server computer, or may be a database computer. The computer 102 comprises a general purpose hardware processor 104A and/or a special purpose hardware processor 104B (hereinafter alternatively collectively referred to as processor 104) and a memory 106, such as random access memory (RAM). The computer 102 may be coupled to other devices, including input/output (I/O) devices such as a keyboard 114, a cursor control device 116 (e.g., a mouse, a pointing device, pen and tablet, etc.), a printer 128, and/or an image capture device 132 (e.g., digital camera, camcorder, digital video camera, cellular device, personal digital assistant, etc.).

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108 to provide output and results.

Output/results may be presented on the display 122 or provided to another device for presentation or further processing or action. In one embodiment, the display 122 comprises a liquid crystal display (LCD) having a plurality of separately addressable liquid crystals. Each liquid crystal of the display 122 changes to an opaque or translucent state to form a part of the image on the display in response to the data or information generated by the processor 104 from the application of the instructions of the computer program 110 and/or operating system 108 to the input and commands. The image may be provided through a graphical user interface (GUI) module 118A. Although the GUI module 118A is depicted as a separate module, the instructions performing the GUI functions can be resident or distributed in the operating system 108, the computer program 110, or implemented with special purpose memory and processors.

Some or all of the operations performed by the computer 102 according to the computer program 110 instructions may be implemented in a special purpose processor 104B. In this embodiment, the some or all of the computer program 110 instructions may be implemented via firmware instructions stored in a read only memory (ROM), a programmable read only memory (PROM) or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 102 may also implement a compiler 112 which allows an application program 110 written in a programming language such as COBOL, Pascal, C++, FORTRAN, or other language to be translated into processor 104 readable code. After completion, the application or computer program 110 accesses and manipulates data accepted from I/O devices and stored in the memory 106 of the computer 102 using the relationships and logic that was generated using the compiler 112.

The computer 102 also optionally comprises an external communication device such as a modem, satellite link, Ethernet card, or other device for accepting input from and providing output to other computers.

In one embodiment, instructions implementing the operating system 108, the computer program 110, and the compiler 112 are tangibly embodied in a computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program instructions which, when accessed, read and executed by the computer 102, causes the computer 102 to perform the steps necessary to implement and/or use the present invention or to load the program of instructions into a memory, thus creating a special purpose data structure causing the computer to operate as a specially programmed computer executing the method steps described herein. Computer program 110 and/or operating instructions may also be tangibly embodied in memory 106 and/or data communications devices 130, thereby making a computer program product or article of manufacture according to the invention. As such, the terms "article of manufacture," "program storage device" and "computer program product" as used herein are intended to encompass a computer program accessible from any computer readable device or media.

Of course, those skilled in the art will recognize that any combination of the above components, or any number of different components, peripherals, and other devices, may be used with the computer 102.

Although the term "user computer" or "client computer" is referred to herein, it is understood that a user computer 102 may include portable devices such as cell phones, notebook computers, pocket computers, or any other device with suitable processing, communication, and input/output capability.

Software Embodiments

Embodiments of the invention provide the ability to receive (e.g., into computer program 110) several different photographs/images, etc. (e.g., input via image capture device 132—referred to herein as "camera") and solving for the location of the camera. Once the location of the camera has been determined, the images can be combined by manipulating the image to a common camera setting and thus more accurately combine the images.

To compute the location of a camera, one must determine the settings for various parameters. As used herein external parameters refer to where a camera device is in space (external of the camera) including camera rotation, camera translation, etc. Similarly, internal parameters refer to parameters internal to the camera such as focal length, non-linear distortion, etc. Both internal and external parameters need to be estimated.

In the prior art, to compute the camera location, 2D feature points are matched across images and various equations are solved in a non-linear manner. In this regard, multi-view equations are written and least squares systems are minimized. Such equations may utilize fundamental matrices (a 3×3 matrix which relates corresponding points in stereo images), trifocal tensors (generalization of the fundamental matrix in three views), and/or an n-view bundle adjustment (optimizing/refining the 3D coordinates). However, as described above, such system solutions are non-linear, and are very large.

One or more embodiments of the invention take advantage of various parameters (i.e., rotation and internal camera parameters) that are known in advance in some applications. In this regard, it is assumed that various internal parameters are known (e.g., rotations). Further, it is also assumed that the only internal parameter not known is translation. Real devices such as the iPhone™ can provide the rotational information needed through a combination of accelerometers, compass and/or gyroscopes. Similarly, gyrometers may provide very accurate rotation measurements in space (e.g., that may be mounted on a camera device). However, while portable devices may be global positioning satellite (GPS) enabled, the GPS provided information is not sufficiently accurate for use in the applications described above. For example, in augmented reality based applications, unless the viewpoint is from a large distance, extreme accuracy is important (e.g., lining up a model with a design, map, picture, etc.).

If rotation parameters are known, a closed-form linear solution exists that allows computation of all camera optical centers at once, taking into account all of the data. Such a linear solution requires a smaller number of point correspondences than that of the prior art (e.g., for a pair of cameras—two instead of five). Further, if the locations of N cameras are to be estimated, a 3N×3N eigenvalue problem is solved (which can be performed in real-time even for large systems). Thus, the linear solution is extremely time effective (singular value decomposition of one 3N×3N symmetric matrix, N being the number of cameras).

Equations used for solving the location can be based on the epipolar geometry between cameras. Epipolar geometry refers to when two cameras view a 3D scene from two distinct positions—a number of geometric relations between the 3D points and their projections onto the 2D images may be determined that lead to constraints between the image points. Using epipolar geometry, each pair of matched points can be resolved by one equation between the two corresponding images:

$$[u_2 \ v_2 \ 1]\underline{t_{12}} \times R_{12} \begin{bmatrix} u_1 \\ v_1 \\ 1 \end{bmatrix} = 0 \quad (1)$$

where $(u_1, v_1)$ are the pixel coordinates in a first image, $(u_2, v_2)$ are the pixel coordinates in a second image, $t_{12}$ represents the unknown translation between cameras one (1) and two (2), and $R_{12}$ represents the known rotation between cameras one (1) and two (2) (e.g., either the rotation in the same camera or from one camera to a second camera). As an example, in a studio setting with cameras mounted on tripods equipped with rotation-sensitive encoders, the pixel coordinates and rotation information can be easily determined. The unknown translation $t_{12}$ is the translation from a first to a second camera (or first and second position of the same moving camera). The above equation computes the cross product of $t_{12}$ and $R_{12}$ which results in a 3×3 matrix. In this regard, the translation $(t_{12})$ is an asymmetric matrix that is built with parameters of $t_{12}$.

Figure 2:
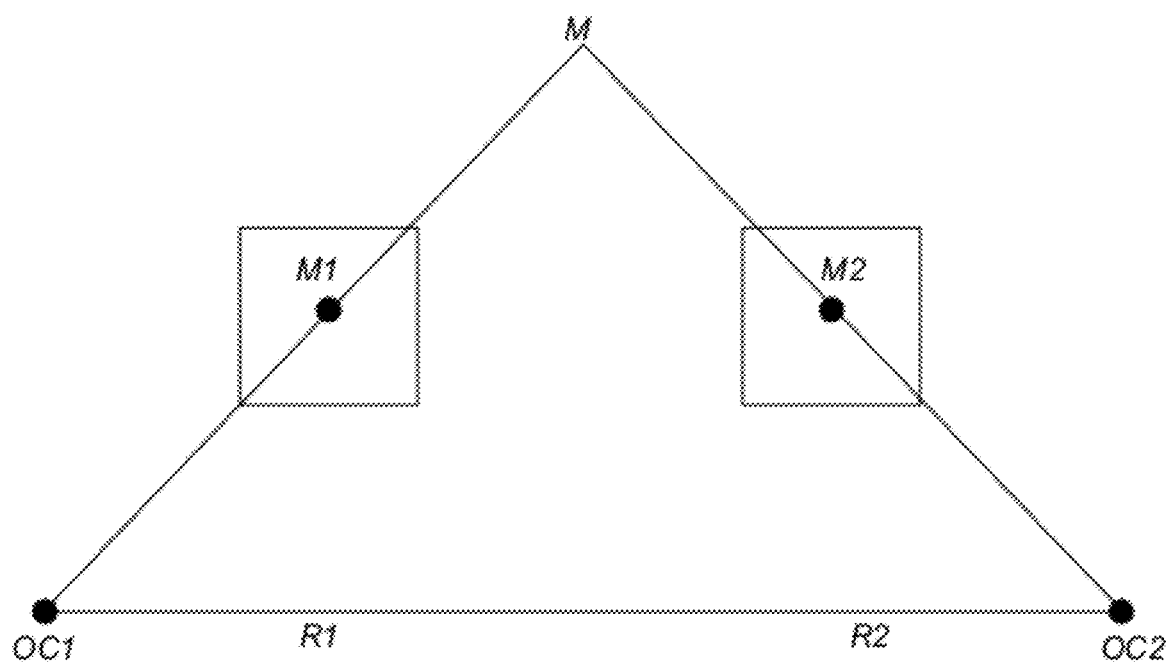
FIG. 2 illustrates two-camera relations that provide a closed form solution for optical centers given camera device rotations in accordance with one or more embodiments of the invention.

The above equation may be rewritten with respect to a world coordinate system (WCS) with points $m_1$ and $m_2$:

$$[(R_1^T m_1) \times (R_2^T m_2)]^T (OC_2 - OC_1) = 0 \quad (2)$$

where: $R_i$ represents the rotation from an origin in WCS to camera i; $m_i$ represents a 3-vector of pixel coordinates in image i (homogeneous coordinates); and $OC_i$ represents the optical center of camera i. Such points and optical centers are illustrated in FIG. 2 in accordance with one or more embodiments of the invention. The equation provides a closed form solution using the optical centers and rotations. Accordingly, based on the above equation the cross product of $R_1$ transpose $m_1$ and $R_2$ transpose $m_2$ is orthogonal to the line joining the optical centers $(OC_2 - OC_1)$ (which is linear). The unknown translation of the optical centers is represented as $OC_2 - OC_1$.

All optical centers $OC_i$ can be stacked into a 3N-vector. By stacking all equations (i.e., equation (2)) from pairwise point correspondences, the following linear system can be obtained:

$$A \cdot \begin{bmatrix} OC_1 \\ OC_2 \\ \dots \\ OC_n \end{bmatrix} = 0 \quad (3)$$

Based on the linear nature of equation (2), each equation (2) can resolve into a single row of matrix A. Each row of matrix A is based on a pair of cameras and corresponds to a pair of matched points between two images i and j. In this regard, each row of matrix A contains exactly six (6) non-zero coefficients in its six (6) columns (3i, 3i+1, 3i+2, 3j, 3j+1, 3j+2). Further, A will have as many columns as the number of coordinates of optical centers (i.e., 3N— where N is the number of cameras/optical centers).

Solving the system reduces to finding the eigenvector of $A^T A$ (a 3N×3N symmetric matrix, N being the number of cameras) corresponding to the smallest Eigen value. The corresponding eigenvector holds all camera optical centers. In practice, A may never be built explicitly, but directly $A^T A$. For each pair of corresponding points, twenty-one (21) coefficients of the upper triangle of $A^T A$ (7*6/2) are updated. In this regard, for each 2D point coordinate, the $A^T A$ is accumulated/increased/updated by the contribution of these point correspondences. Accordingly, the process starts with all coefficients set at zero (0), and loops/iterates over point correspondences—for each match of two points between two images, there are twenty-one (21) coefficients in A that need to be updated (i.e., the upper-triangle of $A^T A$).

Figure 3:
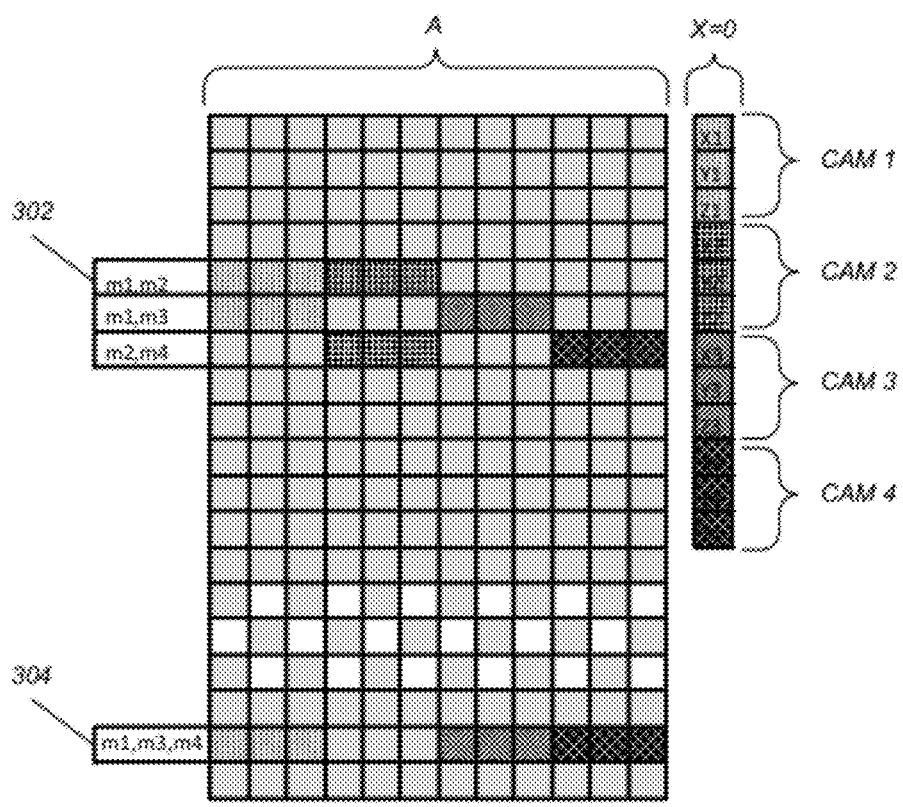
FIG. 3 illustrates the composition of an A matrix and an optical center matrix in accordance with one or more embodiments of the invention.

FIG. 3 illustrates the composition of the A matrix and the optical center matrix in accordance with one or more embodiments of the invention. As illustrated, in Matrix A, at 302, $m_1$ from image 1 is matched with $m_2$ from image 2. Similarly, below 302, $m_1$ from image 1 is matched with $m_3$ from image 3, $m_2$ from image 2 is matched with $m_4$ from image 4, and at 304, $m_1$ from image 1 is matched with $m_3$ from image 3 and $m_4$ from image 4. The 3N matrix (designated as x=0) provides for the optical centers designated by coordinates ($x_i, y_i, z_i$) for each camera (CAM1-CAM4).

In some circumstances, the complete value of the parameters cannot be determined. For example, when camera optical centers are aligned, the cameras have exactly the same rotation and pairwise equations are insufficient to determine the relative distances between the cameras. In this regard, while computing the equations may provide the values of the translations, the relative scale of one translation to another is not determined.

To provide the relative translation when camera optical centers are aligned, more than two cameras are needed. For equations involving more than two (2) cameras, the point correspondence between the cameras (i.e., across camera triplets) provide the relative translation and the missing information/equations (i.e., the relative translation information). Each point triplet provides a linear equation in the three optical centers, than can simply be stacked with the other pairwise equations and encoded in $A^T A$. Thereafter, an additional line may be added to matrix A resulting in nine (9) non-zero coefficients. Accordingly, for each point triplet, forty-five (9*10/2=45) values need to be updated in the upper-triangle of $A^T A$.

Figure 4:
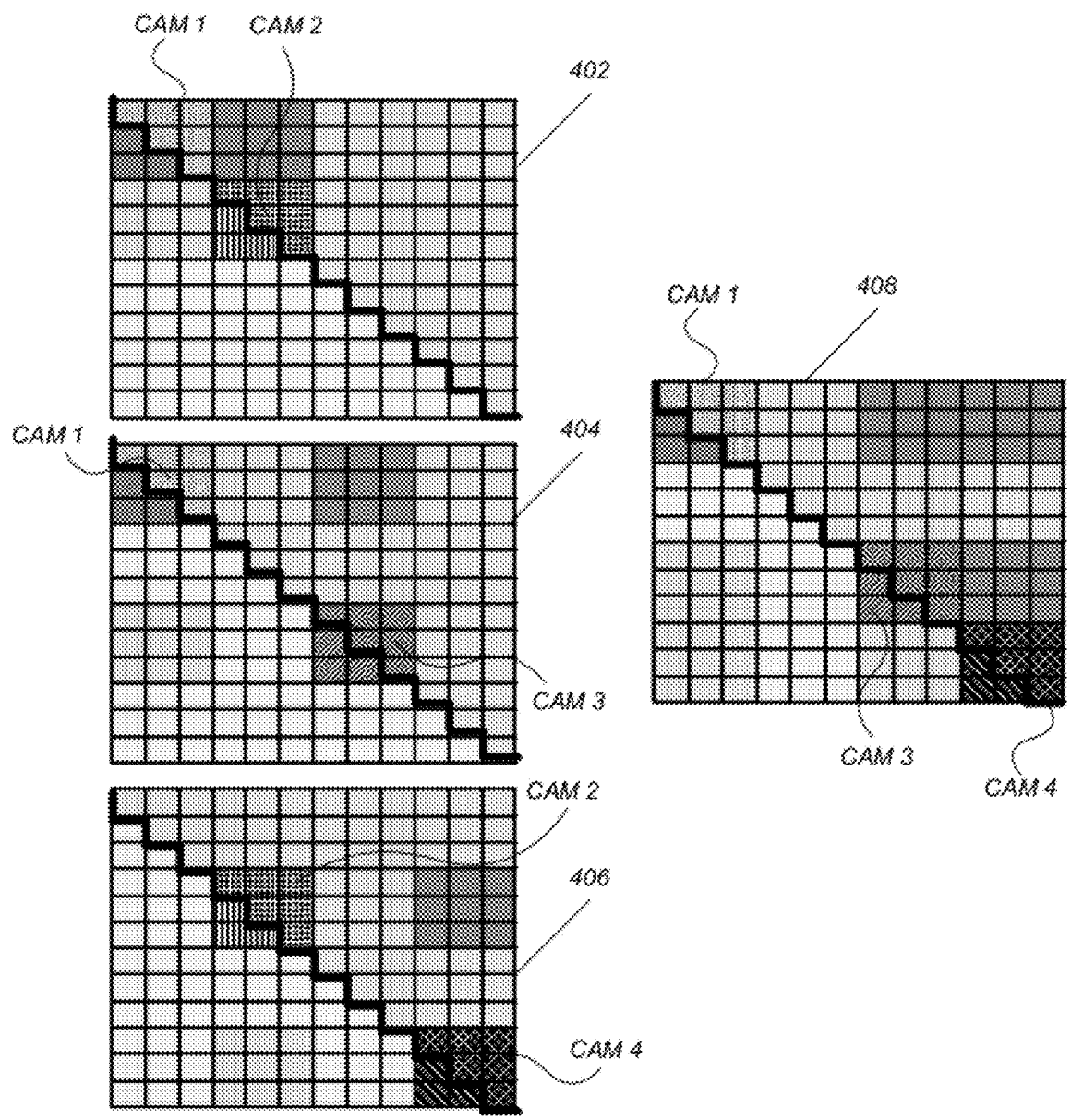
FIG. 4 illustrates various $A^T A$ builds in accordance with one or more embodiments of the invention.

FIG. 4 illustrates various $A^T A$ builds in accordance with one or more embodiments of the invention. As illustrated in 402, A (N×12 with N large) is not built, but only the upper triangle of $A^T A$ (12×12) is utilized. In 404 and 406, it can be seen that each line of A involving two (2) cameras contributes to twenty-one (21) entries of $A^T A$. For each line of A, one only needs to update a small number of entries of $A^T A$ (contributions are summed). Accordingly, at 408, it can be seen that each line of A involving three (3) cameras (CAM1-CAM3) contributes to 45 entries of $A^T A$.

In view of the above, one can attempt to determine the translations mathematically commencing with equation (2). Using three cameras, equation (2) can be rewritten and resolved as follows:

$$\begin{bmatrix} m_1 \times R_1 & m_1 \times t_1 \\ m_2 \times R_2 & m_2 \times t_2 \\ m_3 \times I & 0 \end{bmatrix} M = 0 \Rightarrow M = \begin{bmatrix} m_3 \\ \gamma \end{bmatrix} \quad (4)$$

Equation (4) can be simplified as follows:

$$\begin{cases} \frac{1}{\gamma}(m_1 \times R_1)m_3 + (m_1 \times t_1) = 0 \\ \frac{1}{\gamma}(m_2 \times R_2)m_3 + (m_2 \times t_2) = 0 \end{cases} \quad (5)$$

which can further be simplified by eliminating $$\frac{1}{\gamma}$$

as follows:

$$(m_1 \times t_1)^T (m_2 \times R_2 m_3) = (m_2 \times t_2)^T (m_1 \times R_1 m_3) \quad (6)$$

Additional simplification to eliminate $$\frac{1}{\gamma}$$

may provide as follows:

$$\begin{cases} (m_1 \times t_1) \times (m_1 \times R_1 m_3) = 0 \\ (m_2 \times t_2) \times (m_2 \times R_2 m_3) = 0 \end{cases} \quad (7)$$

One may simplify the cross product of the first line of equation (7) as follows:

$$[(m_1 \times t_1)^T R_1 m_3] m_1 - [(m_1 \times t_1)^T m_1] R_1 m_3 \quad (8)$$

The second term of the equation being equal to zero, one ends up with equation:

$$(m_1 \times t_1)^T R_1 m_3 = 0$$

that represents the epipolar geometry between 1 and 3 and is similar in form to equation (1). Applying the same approach to simplify the second lines leads to the epipolar relation between images 2 and 3

Thereafter, one can come back to a representation based on the optical centers, and bringing back $R_3$ and $OC_3$ into equation (6) as follows:

$$V_1 = m_1 \times (R_1 R_3^T m3) \text{ and}$$

$$V_2 = m_2 \times (R_2 R_3^T m3) \quad (9)$$

we obtain the final result:

$$R_1^T (m_1 \times V_2)(OC_1 - OC3) = R_2^T (m_2 \times V_1)(OC_2 - OC_3) \quad (10)$$

Equations (1)-(10) provide a series of computations to arrive at the system of linear equations. In this regard, all of the points $m_1 - m_3$, and rotations $R_1 - R_3$ are known. After various simplifications, the ending system of linear equations utilize the optical centers $OC_1 - OC_3$. Equation (10), once solved, provides A transpose A that will reveal all of the translations that are needed. The translations enable the ability to match up pictures/pixels. Thus, with the known internal parameters, one can determine how all of the cameras relate to each other in space. Thereafter, with any given point, it can be matched to another point and triangulated to determine where it lies in space.

Since all of the equations (1)-(10) end up as linear accumulation of coefficients into a matrix, each of these equations can be assigned an independent weight. Weights can be used, for instance, to:

(a) Control the importance of a given matched point (control the weight of all equations containing that point). This can be useful, for instance, when the point matching process returns a confidence score: equations involving points with higher matching confidence can be assigned a higher weight;

(b) Control the importance of a given image in the computation, by controlling the weight of all equations dealing with that image. This can be useful, for instance, to limit computation to a given band in time. For instance, each new image coming would be computed with only the N previous images, or with all of them but higher weights would be assigned to the more "recent" images and the older ones "fade out". This could be useful to handle information on the accuracy on the rotation data provided by the sensor, if available; and/or (c) Refine the estimate and make it more accurate in a two-pass computation.

In view of the above, one can note that in the prior art, equipment was used to obtain all angles from the cameras and the translations. Such computations were required to be performed in advance. Embodiments of the present invention enable the determination of translations dynamically on the fly in real time.

Logical Flow

Figure 5:
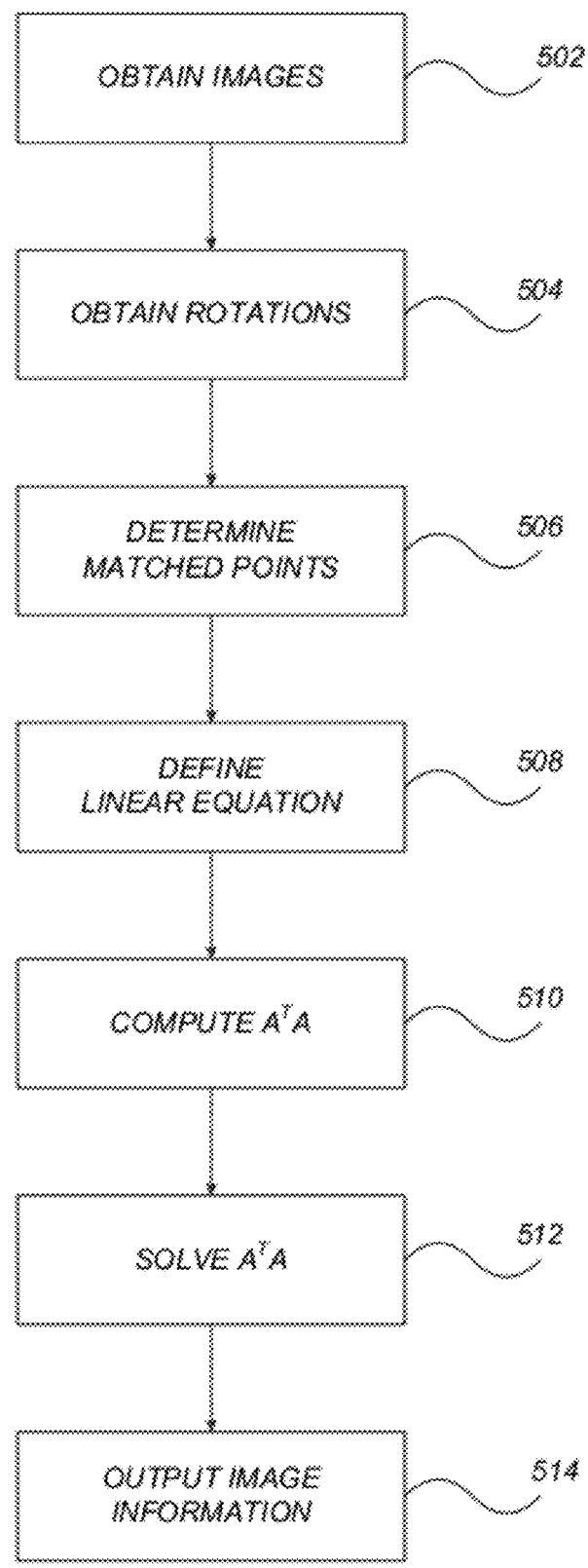
FIG. 5 is a flow chart illustrating the logical flow for determining two or more camera viewpoint optical centers in accordance with one or more embodiments of the invention.

FIG. 5 is a flow chart illustrating the logical flow for determining two or more camera viewpoint optical centers in accordance with one or more embodiments of the invention.

At step 502, a first image and a second image captured by one or more camera devices are obtained. The images may be captured by a single camera device or by different devices.

At step 504, a first rotation ($R_1$) corresponding to the camera device that captured the first image and a second rotation (R2) corresponding to a camera device that captured the second image are obtained. The rotations may consist of rotations from a world coordinate space origin to the respective camera device.

At step 506, one or more pairs of matched points between the first image and the second image are determined.

At step 508, for each pair of matched points a linear equation is defined:

$$[(R_1{}^T m_1) \times (R_2{}^T m_2)]^T (OC_2 - OC_1) = 0$$

wherein, $OC_i$ comprises an optical center of a camera device i, and $m_i$ comprises a 3-vector of pixel coordinates for the matched point in image i.

At step 510, a square matrix A transpose A ($A^T A$) is computed. Each row of A corresponds to one of the pairs of matched points. The number of columns of A is 3N, wherein N comprises the number of camera devices. In some embodiments, instead of computing matrix A itself, matrix $A^T A$ is directly computed. For each pair of matched points, twenty-one (21) coefficients of an upper-triangle of $A^T A$ are updated to represent the corresponding linear equation.

At step 512, the matrix $A^T A$ is solved to determine an eigenvector that holds two or more camera viewpoint optical centers. Since the solution of the system is defined up to an unknown translation in space (corresponding to an arbitrary choice of the world origin), an approach to address this problem consists of adding the linear constraint that the sum of optical centers should be zero, i.e., the center of mass of all cameras is at the world origin. Another approach could be to fix the optical center of one of the cameras to be zero, fixing that camera at the world origin, and updating the equations accordingly. In that case, the corresponding 3 lines of the camera vector, of the A matrix, and/or lines/columns of the $A^T A$ matrix can be eliminated from the system, and an eigenvector of 3(N-1) coordinates is searched for.

At step 514, image information that utilizes the two or more camera viewpoint optical centers, is output (e.g., displayed, provided to a special effects program, transmitted to another computer/application, etc.).

As described above, to properly handle cases where three or more of the camera viewpoints optical centers can be potentially aligned, additional calculations/computations may be necessary. In this regard, should alignment of the optical centers occur, point matches between the three or more images may be obtained/utilized. Depending on the application context, all or some of the point triplets containing a 3-subset of the points matched together in all the images may be used. Each point triplet provides a linear equation in three camera viewpoint optical centers, that is represented by one additional row in matrix A. In each of these rows, 9 (nine) coefficients are non-zero. When updating directly matrix $A^T A$, only forty-five (45) values in the upper-triangle of $A^T A$ need to be updated. Lastly, the same solving process as described above with respect to step 512 may be applied to matrix $A^T A$ to derive the 3D coordinates of all optical centers.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for determining two or more camera viewpoint optical centers comprising:
   (a) obtaining a first image and a second image captured by one or more camera devices;
   (b) obtaining a first rotation ($R_1$) corresponding to one of the one or more camera devices that captured the first image and a second rotation (R2) corresponding to one of the one or more camera devices that captured the second image;
   (c) determining one or more pairs of matched points between the first image and the second image;
   (d) for each pair of matched points between the first image and the second image, defining a linear equation comprising:

$$[(R_1{}^T m_1) \times (R_2{}^T m_2)]^T (OC_2 - OC_1) = 0$$

wherein, $OC_i$ comprises an optical center of a camera device i, and $m_i$ comprises a 3-vector of pixel coordinates for the matched point in image i;

(e) computing a square matrix A transpose A ($A^TA$), wherein:
  (i) each row of A corresponds to one of the one or more pairs of matched points between the first image and the second image; and
  (ii) a number of columns of A comprises 3N, wherein N comprises a number of the one or more camera devices;
(f) solving the matrix $A^TA$ to determine an eigenvector that holds the two or more camera viewpoint optical centers; and
(g) outputting image information utilizing the two or more camera viewpoint optical centers.

2. The method of claim 1, wherein:
the first rotation comprises a rotation from a world coordinate space origin to the first camera device; and
the second rotation comprises a rotation from the world coordinate space origin to the second camera device.

3. The method of claim 1, wherein a single camera device captures the first image and the second image.

4. The method of claim 1, wherein different camera devices capture the first image and the second image.

5. The method of claim 1, wherein $A^TA$ is directly computed by updating forty-five (45) values in an upper-triangle of $A^TA$.

6. The method of claim 1, wherein the solving comprises updating twenty-one (21) coefficients of an upper-triangle of $A^TA$.

7. The method of claim 1, further comprising:
(a) obtaining a third image;
(b) obtaining a third rotation (R3) corresponding to one of the one or more camera devices that captured the third image;
(c) the determining of one or more pairs of matched points matches point triplets between the first image, the second image, and the third image; and
(d) each point triplet provides a linear equation in three camera viewpoint optical centers that is represented by an additional row in matrix A.

8. An apparatus for determining two or more camera viewpoint optical centers in a computer system comprising:
(a) a computer having a memory; and
(b) an application executing on the computer, wherein the application is configured to:
  (i) obtain a first image and a second image captured by one or more camera devices;
  (ii) obtain a first rotation ($R_1$) corresponding to one of the one or more camera devices that captured the first image and a second rotation (R2) corresponding to one of the one or more camera devices that captured the second image;
  (iii) determine one or more pairs of matched points between the first image and the second image;
  (iv) for each pair of matched points between the first image and the second image, define a linear equation comprising:

$$[(R_1^T m_1) \times (R_2^T m_2)]^T (OC_2 - OC_1) = 0$$

wherein, $OC_i$ comprises an optical center of a camera device i, and $m_i$ comprises a 3-vector of pixel coordinates for the matched point in image i;
  (v) compute a square matrix A transpose A ($A^TA$), wherein:
    (1) each row of A corresponds to one of the one or more pairs of matched points between the first image and the second image; and
    (2) a number of columns of A comprises 3N, wherein N comprises a number of the one or more camera devices; and
  (vi) solve the matrix $A^TA$ to determine an eigenvector that holds the two or more camera viewpoint optical centers; and
  (vii) output image information utilizing the two or more camera viewpoint optical centers.

9. The apparatus of claim 8, wherein:
the first rotation comprises a rotation from a world coordinate space origin to the first camera device; and
the second rotation comprises a rotation from the world coordinate space origin to the second camera device.

10. The apparatus of claim 8, wherein a single camera device captures the first image and the second image.

11. The apparatus of claim 8, wherein different camera devices capture the first image and the second image.

12. The apparatus of claim 8, wherein $A^TA$ is directly computed by updating forty-five (45) values in an upper-triangle of $A^TA$.

13. The apparatus of claim 8, wherein the application is configured to solve by updating twenty-one (21) coefficients of an upper-triangle of $A^TA$.

14. The apparatus of claim 8, wherein the application is further configured to:
(a) obtain a third image;
(b) obtain a third rotation (R3) corresponding to one of the one or more camera devices that captured the third image;
(c) the application determines the one or more pairs of matched points by matching point triplets between the first image, the second image, and the third image; and
(d) each point triplet provides a linear equation in three or more camera viewpoint optical centers.

15. A non-transitory computer readable storage medium encoded with computer program instructions which when accessed by a computer cause the computer to load the program instructions to a memory therein creating a special purpose data structure causing the computer to operate as a specially programmed computer, executing a method of determining two or more camera viewpoint optical centers, comprising:
(a) obtaining, in the specially programmed computer, a first image and a second image captured by one or more camera devices;
(b) obtaining, in the specially programmed computer, a first rotation ($R_1$) corresponding to one of the one or more camera devices that captured the first image and a second rotation (R2) corresponding to one of the one or more camera devices that captured the second image;
(c) determining, in the specially programmed computer, one or more pairs of matched points between the first image and the second image;
(d) for each pair of matched points between the first image and the second image, defining, in the specially programmed computer, a linear equation comprising:

$$[(R_1^T m_1) \times (R_2^T m_2)]^T (OC_2 - OC_1) = 0$$

wherein, $OC_i$ comprises an optical center of a camera device i, and $m_i$ comprises a 3-vector of pixel coordinates for the matched point in image i;
(e) computing, in the specially programmed computer, a square matrix A transpose A ($A^TA$), wherein:
  (i) each row of A corresponds to one of the one or more pairs of matched points between the first image and the second image; and (ii) a number of columns of A comprises 3N, wherein N comprises a number of the one or more camera devices;

(f) solving, in the specially programmed computer, the matrix $A^TA$ to determine an eigenvector that holds the two or more camera viewpoint optical centers; and (g) outputting, in the specially programmed computer, image information utilizing the two or more camera viewpoint optical centers.

16. The computer readable storage medium of claim 15, wherein:

the first rotation comprises a rotation from a world coordinate space origin to the first camera device; and the second rotation comprises a rotation from the world coordinate space origin to the second camera device.

17. The computer readable storage medium of claim 15, wherein a single camera device captures the first image and the second image.

18. The computer readable storage medium of claim 15, wherein different camera devices capture the first image and the second image.

19. The computer readable storage medium of claim 15, wherein $A^TA$ is directly computed by updating forty-five (45) values in an upper-triangle of $A^TA$.

20. The computer readable storage medium of claim 15, wherein the solving comprises updating twenty-one (21) coefficients of an upper-triangle of $A^TA$.

21. The computer readable storage medium of claim 15, wherein the method further comprises:

(a) obtaining a third image;

(b) obtaining a third rotation (R3) corresponding to one of the one or more camera devices that captured the third image;

(c) the determining of one or more pairs of matched points matches point triplets between the first image, the second image, and the third image; and (d) each point triplet provides a linear equation in three or more camera viewpoint optical centers.

* * * * *